(No Model.)

O. F. DREW.
CAN FOR CEMENT.

No. 445,832. Patented Feb. 3, 1891.

WITNESSES
O. G. Bartlett
Ewing W. Hamlen

INVENTOR
Oscar F. Drew
by Knight Brown Crosley
Attys.

UNITED STATES PATENT OFFICE.

OSCAR F. DREW, OF NEWBURYPORT, MASSACHUSETTS.

CAN FOR CEMENT.

SPECIFICATION forming part of Letters Patent No. 445,832, dated February 3, 1891.

Application filed August 13, 1890. Serial No. 361,926. (No model.)

*To all whom it may concern:*

Be it known that I, OSCAR F. DREW, of Newburyport, in the county of Essex and State of Massachusetts, have invented certain new and useful Improvements in Cement Cans or Holders, of which the following is a specification.

This invention has for its object to provide a can or holder adapted to hold rubber cement and other like volatile compounds and permit the use of the same as required without exposing the entire accumulation to the atmosphere. Rubber cement is a composition of rubber and naphtha, and owing to the volatile nature of the naphtha it soon evaporates when exposed to the atmosphere.

The invention consists in the improved can or holder comprising a reservoir having a supply-opening in its upper portion adapted to be closed air-tight, a series of independent outlets at its lower portion, communicating with an open trough or pan at the base of the reservoir, so that the cement can flow from the reservoir into said pan, to be there taken up by a brush or other device used in spreading it, and a pivoted gate or valve connected with the body of the reservoir and provided with a series of orifices corresponding with the outlets of the reservoir, said gate or valve being arranged so that when turned upon its pivot one or more of its orifices may be caused to coincide with the orifices of the reservoir, and thereby permit a more or less rapid flow of the cement into the pan, while by another movement of the valve or gate all the orifices of the reservoir may be closed to entirely stop the flow of cement into the pan, all of which I will now proceed to describe.

Figure 1:
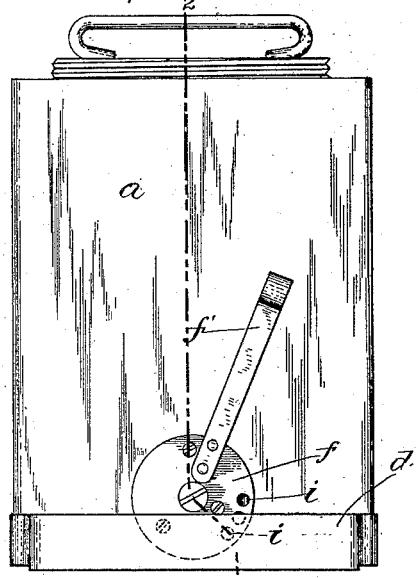
Figure 2:
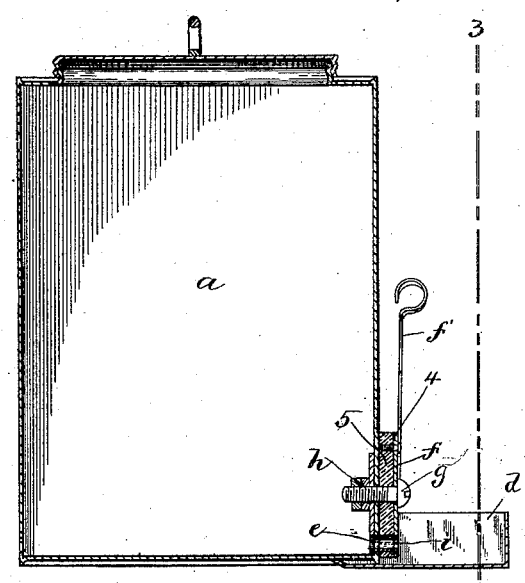
Figure 3:
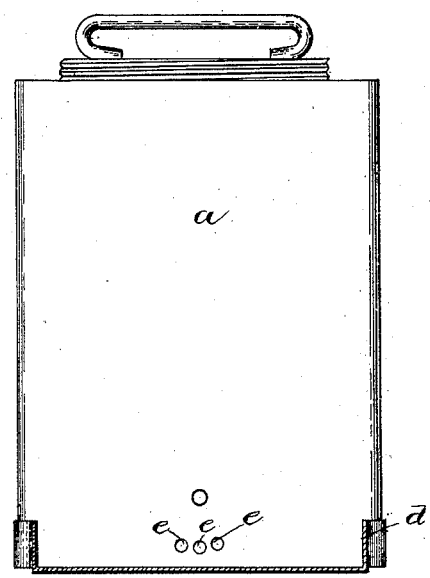

Of the accompanying drawings, forming a part of this specification, Figure 1 represents a front elevation of a cement can or holder embodying my improvements. Fig. 2 represents a section on line 2 2, Fig. 1. Fig. 3 represents a section on line 3 3, Fig. 2, looking toward the left in the last-named figure, the valve or gate being removed from the reservoir to show the series of outlet-orifices in the latter.

The same letters and numerals of reference indicate the same parts in all the figures.

In the drawings, $a$ represents a can or receptacle, preferably constructed of sheet metal and adapted to hold rubber cement. The body of the can is provided with a supply-opening $b$, which may be closed air-tight by a suitable cap or cover $c$, said opening being here shown as surrounded by a screw-threaded flange, upon which a corresponding-screw-threaded flange of the cover is screwed.

$d$ represents the open pan or trough, which is attached to the lower portion of the can $a$ and projects from one side thereof. The side of the can from which the pan or trough $d$ projects is provided with a series of outlet-orifices $e\ e\ e$, Figs. 2 and 3, arranged to permit the cement to flow from the can into the pan or trough.

$f$ represents a circular valve or gate, which is connected to the side of the can containing the orifices $e$ by a central screw or pivot $g$, passing through the center of the valve or gate and through the side of the can and held by a nut $h$, applied to its inner portion and bearing on the inner surface of the side of the can, as shown in Fig. 2.

The valve or gate $f$ is composed of a metallic disk 4 and a disk or washer 5, of leather or other suitable material, the disk or washer 5 being interposed between the disk 4 and the side of the can, and held in close contact with the latter by the head of the screw $g$, which bears upon the metallic disk 4, and is held in close contact therewith by the nut $h$, as shown in Fig. 2.

The valve or gate is provided with a series of orifices $i\ i$, passing entirely through it, and arranged so that when the valve is turned on its pivot to a given position said orifices $i$ will coincide with the orifices $e$ of the can and permit the cement to flow through all of said orifices into the pan or trough $d$. The valve or gate may be turned so that any number of its orifices $i$ less than the whole will coincide with a corresponding number of the orifices $e$, so that the cement may flow through one or any other desired number of the orifices $e$. When the valve or gate is turned to still another position, its imperforate portion entirely covers the orifices $e$, so that no cement can escape, the yielding disk 5 of the valve or gate, pressed closely against the side of the can, as described, constituting a tight stopper or cover, which prevents any leakage of the cement into the pan or trough. The valve or gate is provided with a handle $f'$, whereby it may be turned from one position to another.

It will be seen that the can provided with the orifices $e$ and the valve or gate constructed and applied as described and provided with corresponding orifices enable the delivery of the cement to be perfectly controlled and any leakage thereof prevented. The series of orifices in the can and the corresponding series of orifices in the valve or gate constitute elongated outlets for the can, the length or capacity of the oulet being varied by the described adjustments of the valve.

I claim—

The can $a$, having at its base or lower portion the pan or trough $d$ and an elongated outlet arranged to permit the flow of cement from the can into the pan or trough, combined with the valve or gate $f$, having an elastic or yielding inner surface bearing on the side of the can, and provided with an elongated outlet arranged to coincide with the outlet of the can when the valve is turned to a given position, and means for pivotally connecting the valve to the can and pressing the yielding surface of the valve closely against the can, as set forth.

In testimony whereof I have signed my name to this specification, in the presence of two subscribing witnesses, this 29th day of July, A. D. 1890.

OSCAR F. DREW.

Witnesses:
JOHN L. KNIGHT,
G. M. BAKER.